Oct. 27, 1925.
J. W. BAGLEY ET AL
1,559,400
AERO CAMERA
Filed April 4, 1921   10 Sheets-Sheet 1
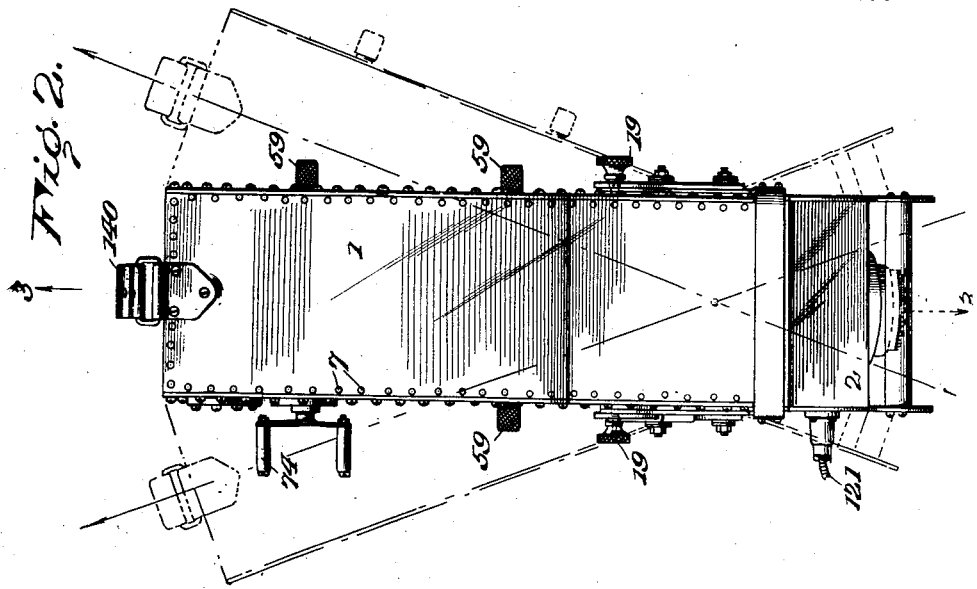
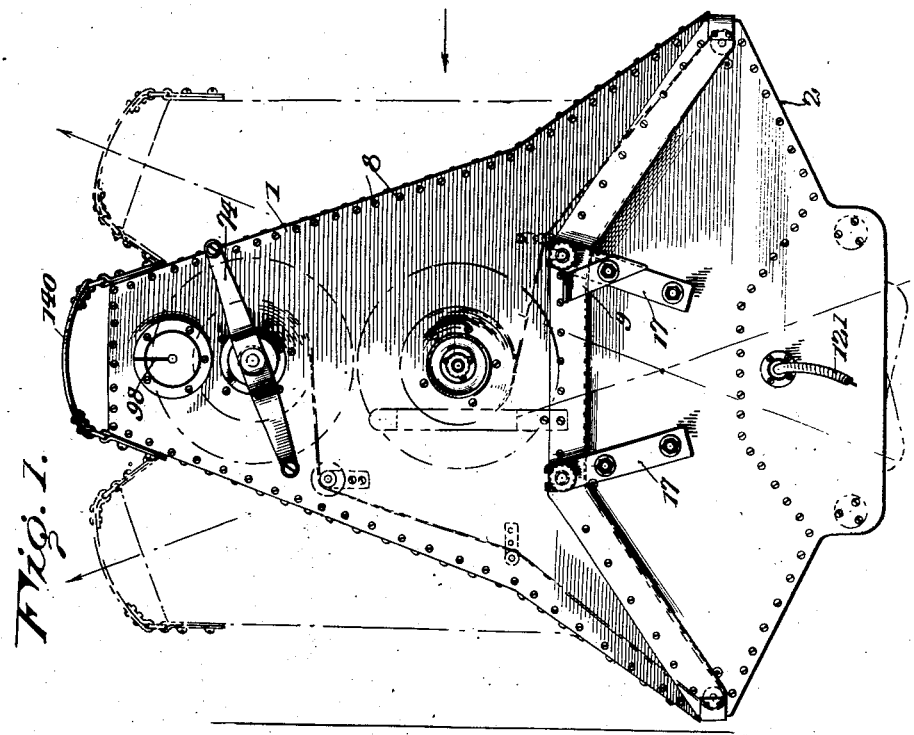
INVENTORS,
James W. Bagley
BY Carl H. ...
Mauro, Cameron, Lewis & Kirkam
ATTORNEYS.

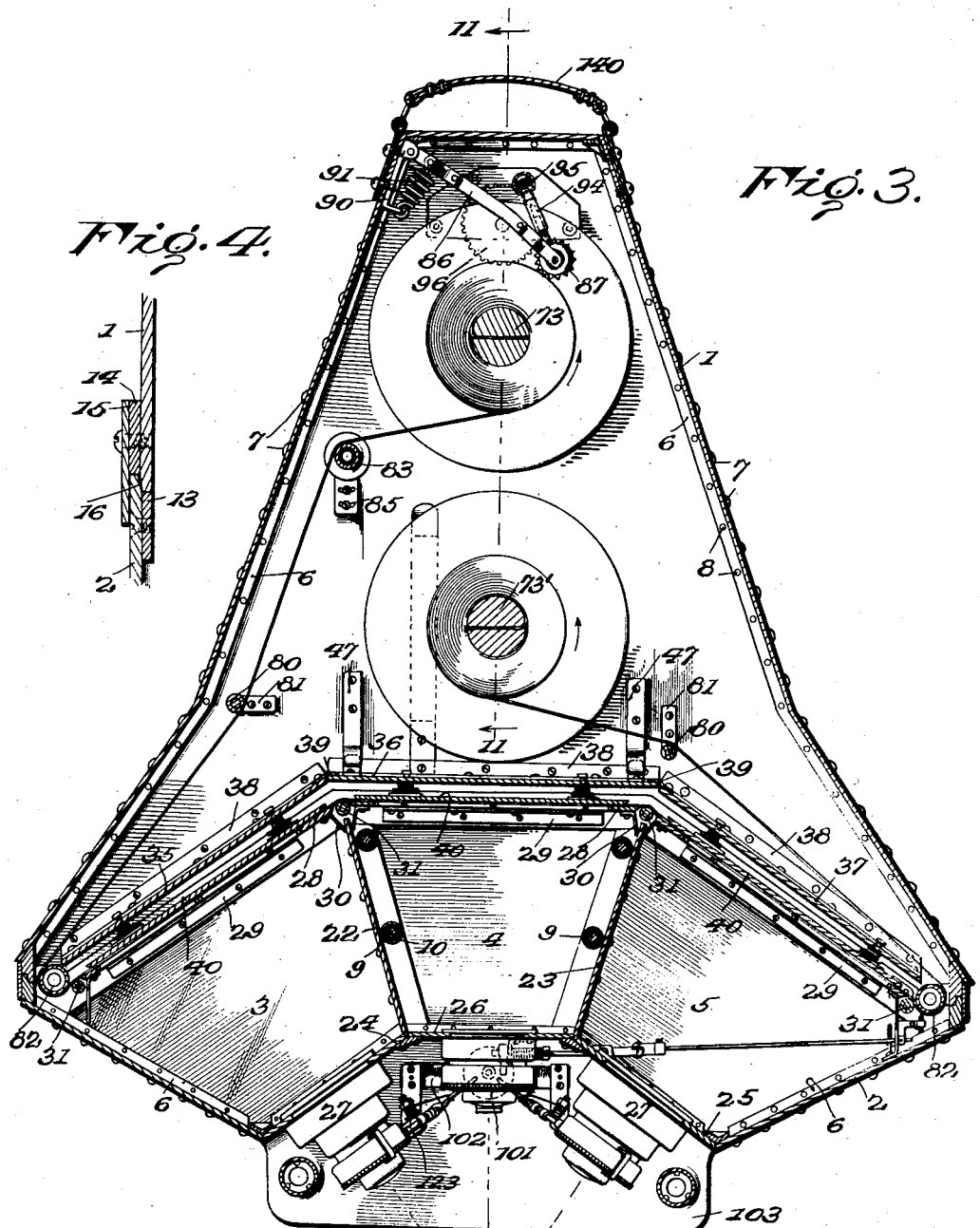

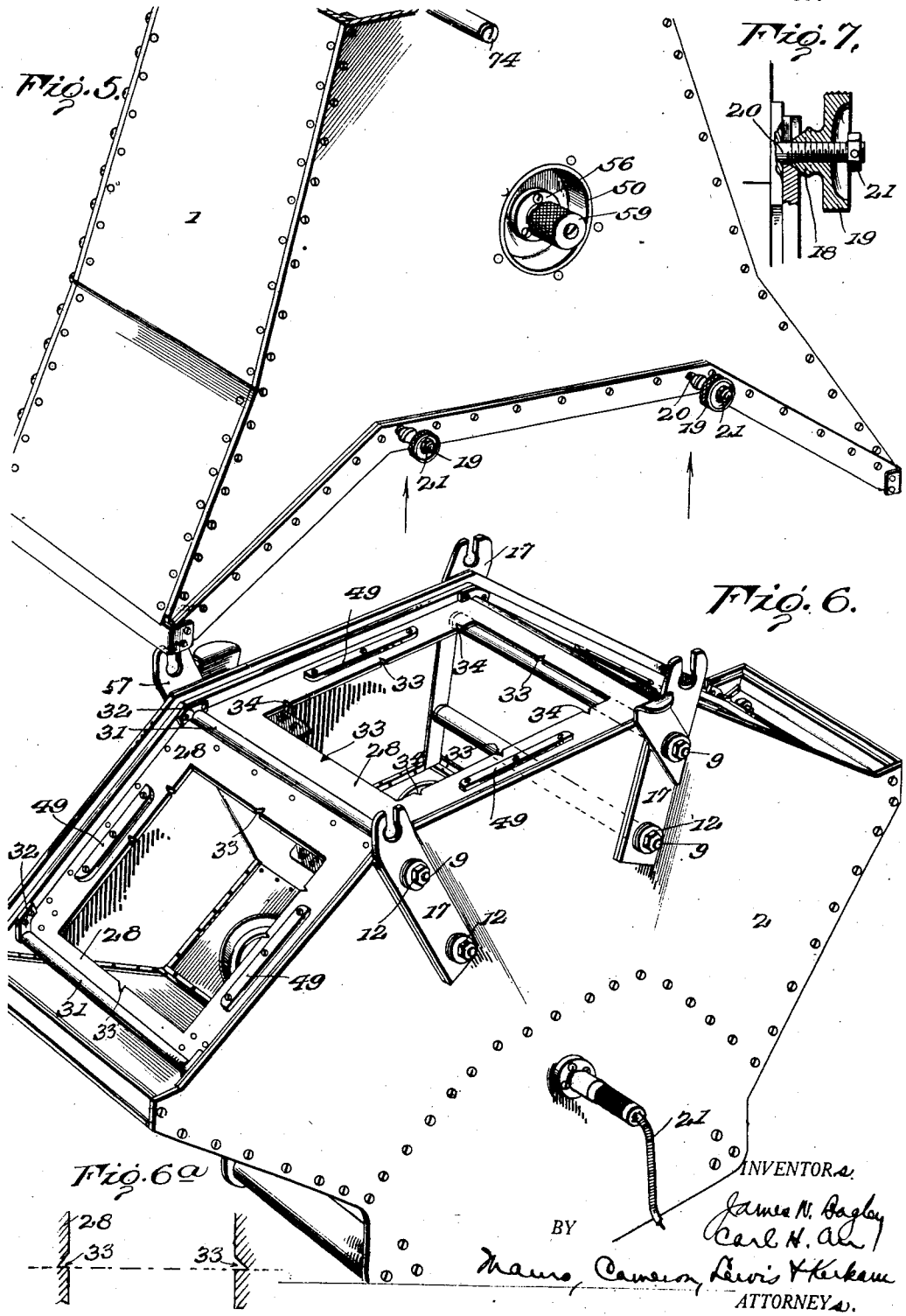

Oct. 27, 1925.
J. W. BAGLEY ET AL
AERO CAMERA
Filed April 4, 1921    10 Sheets-Sheet 4
1,559,400
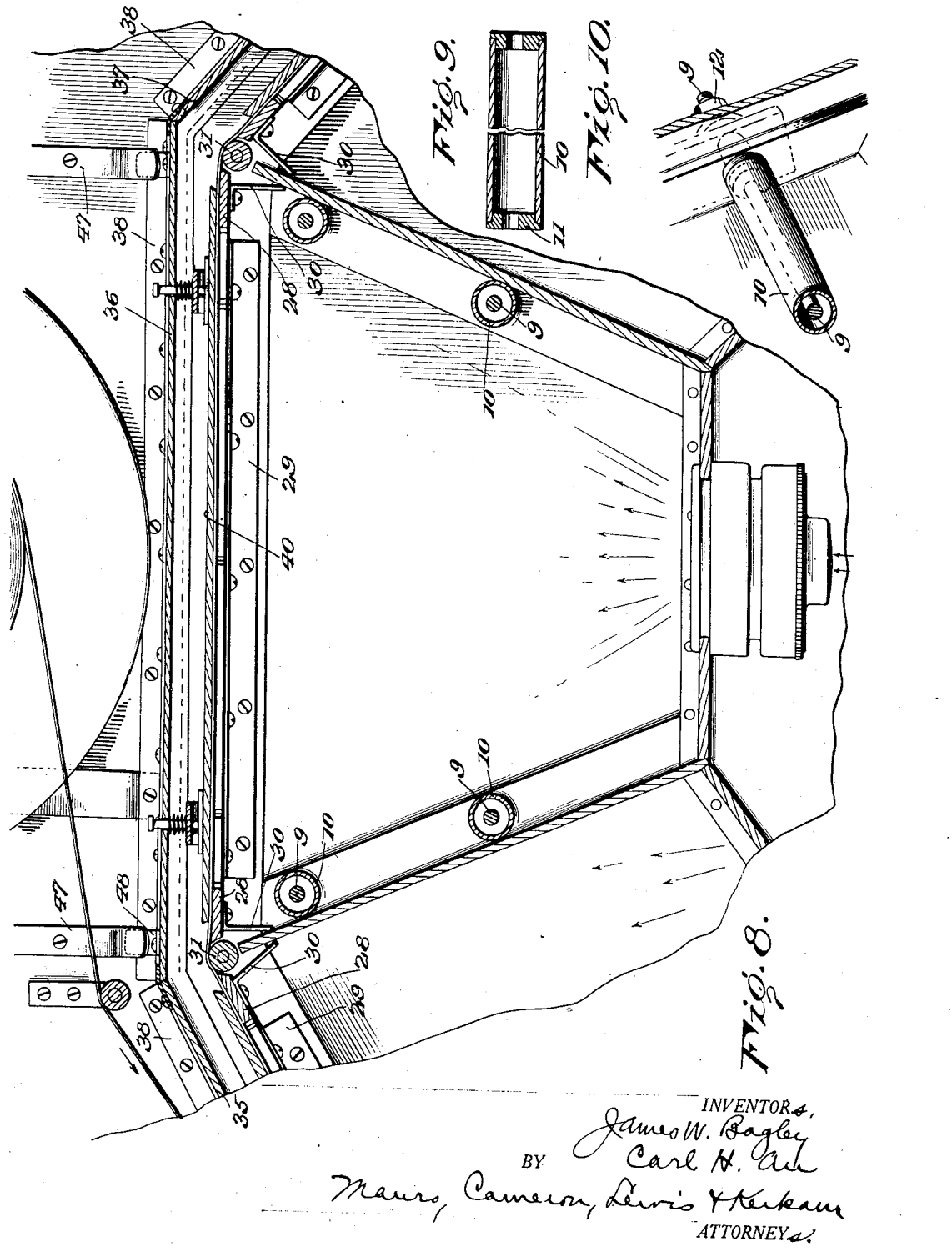

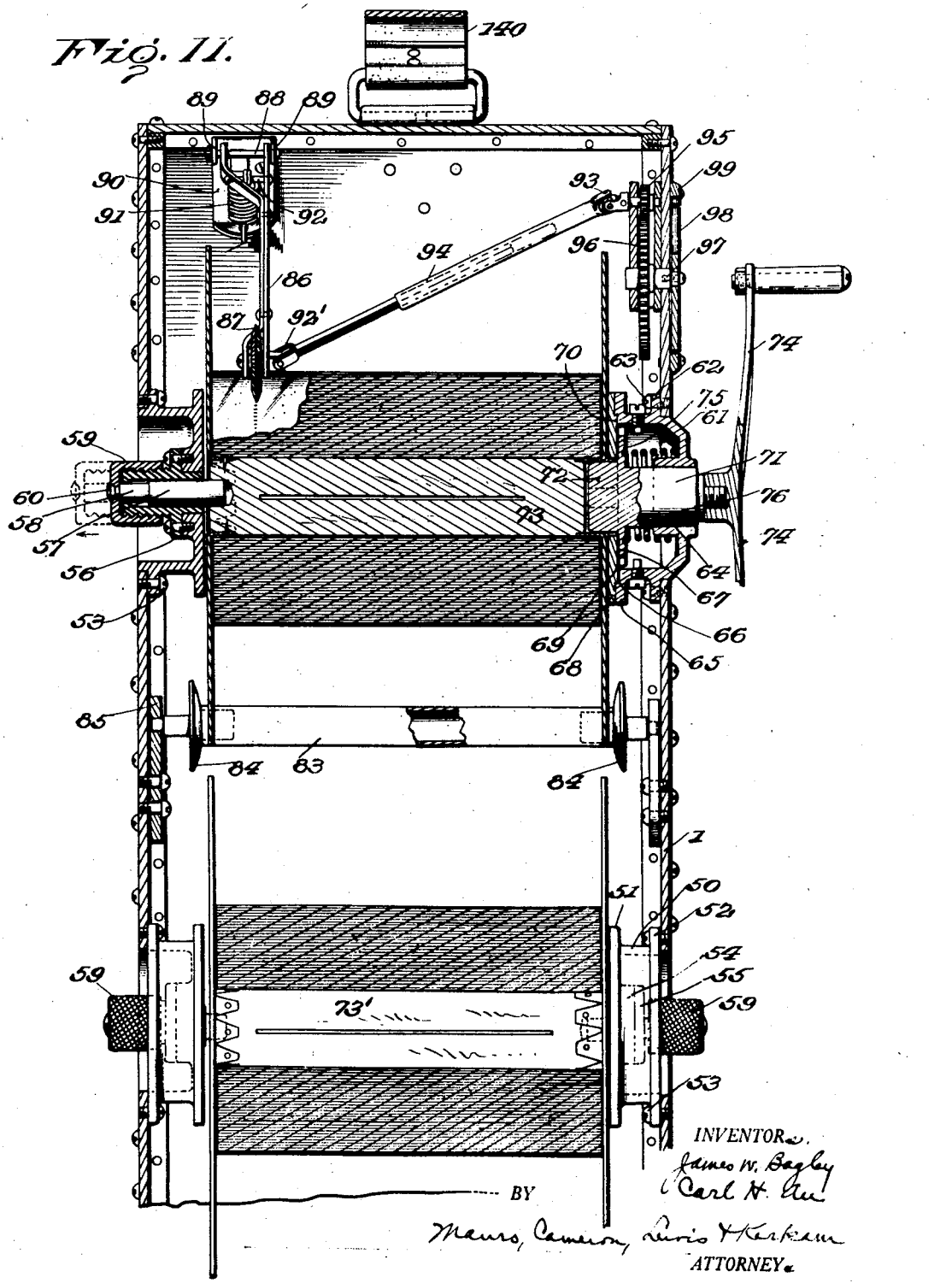

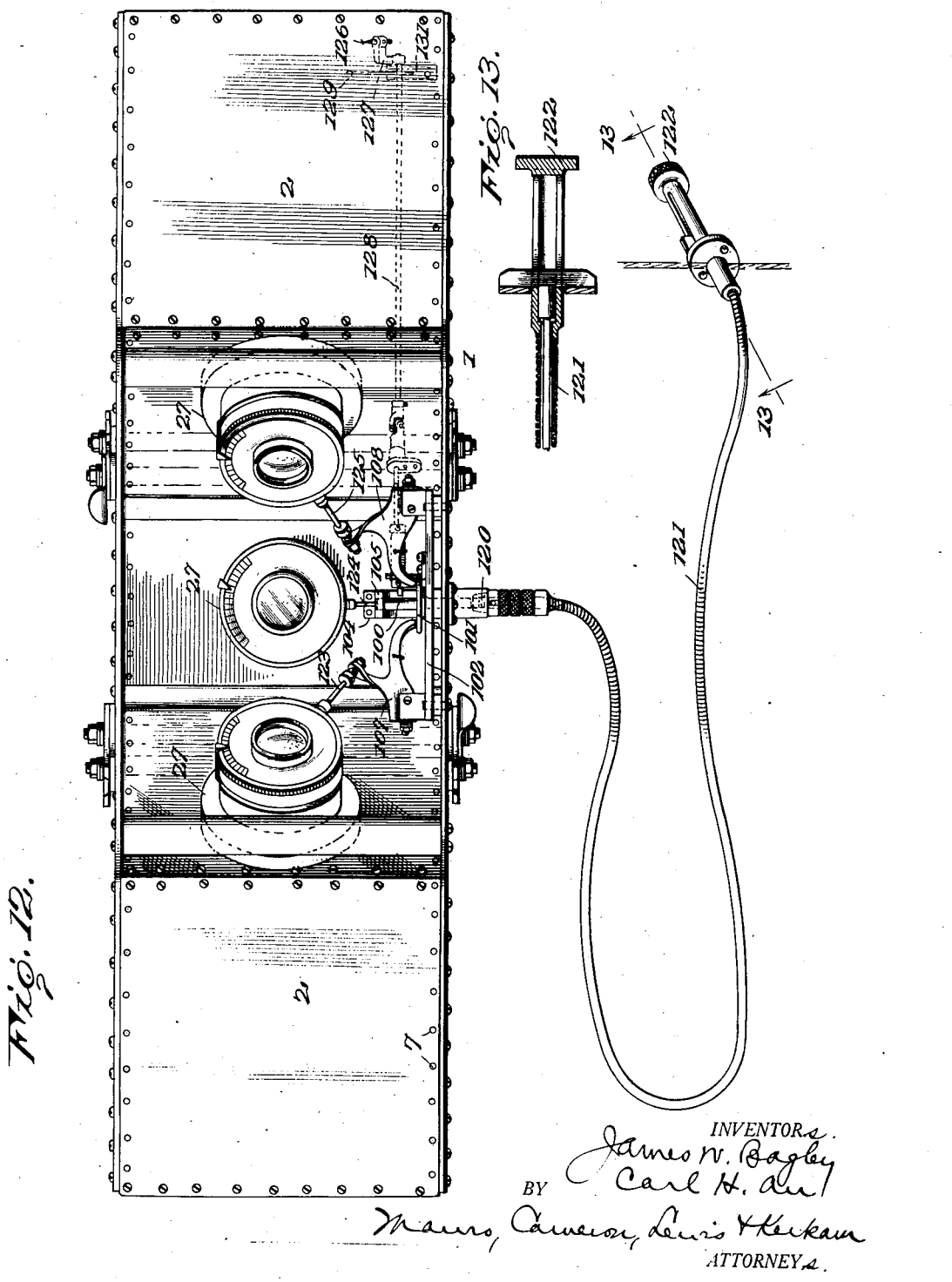

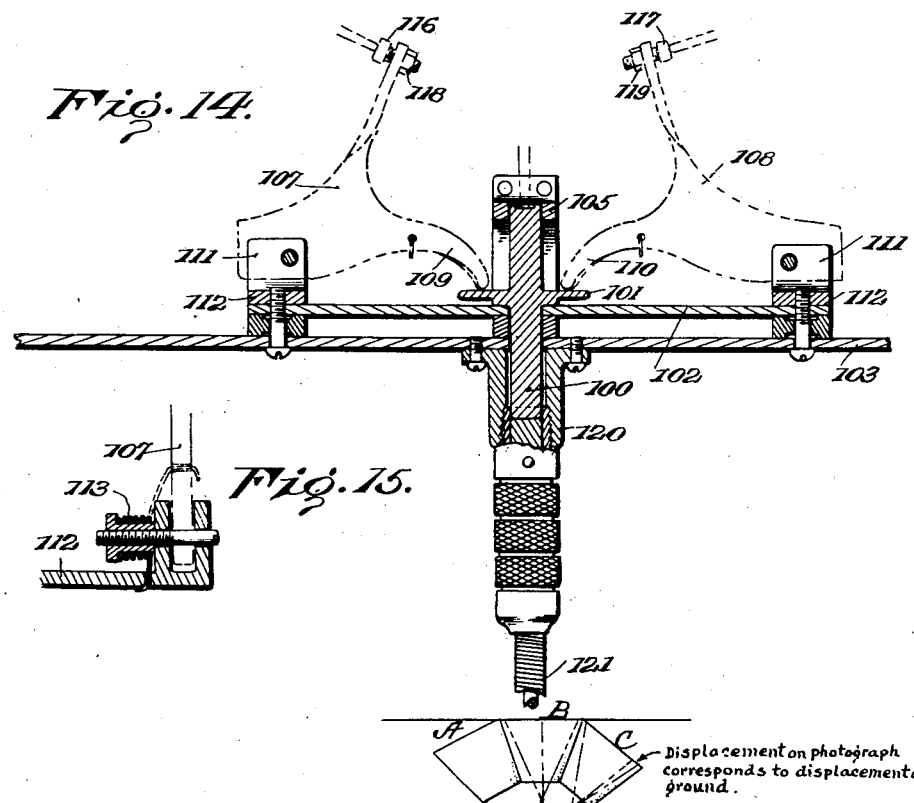
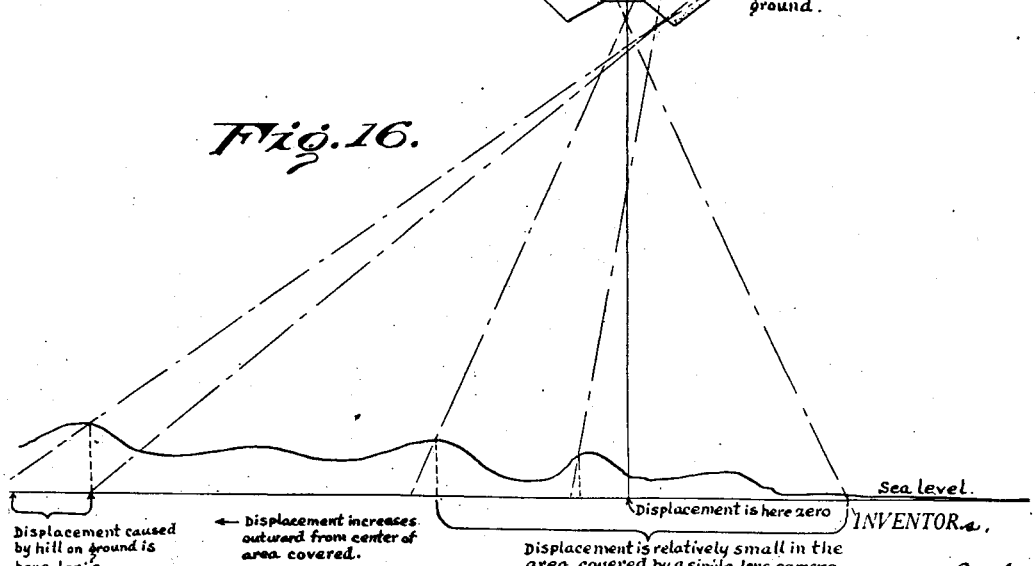

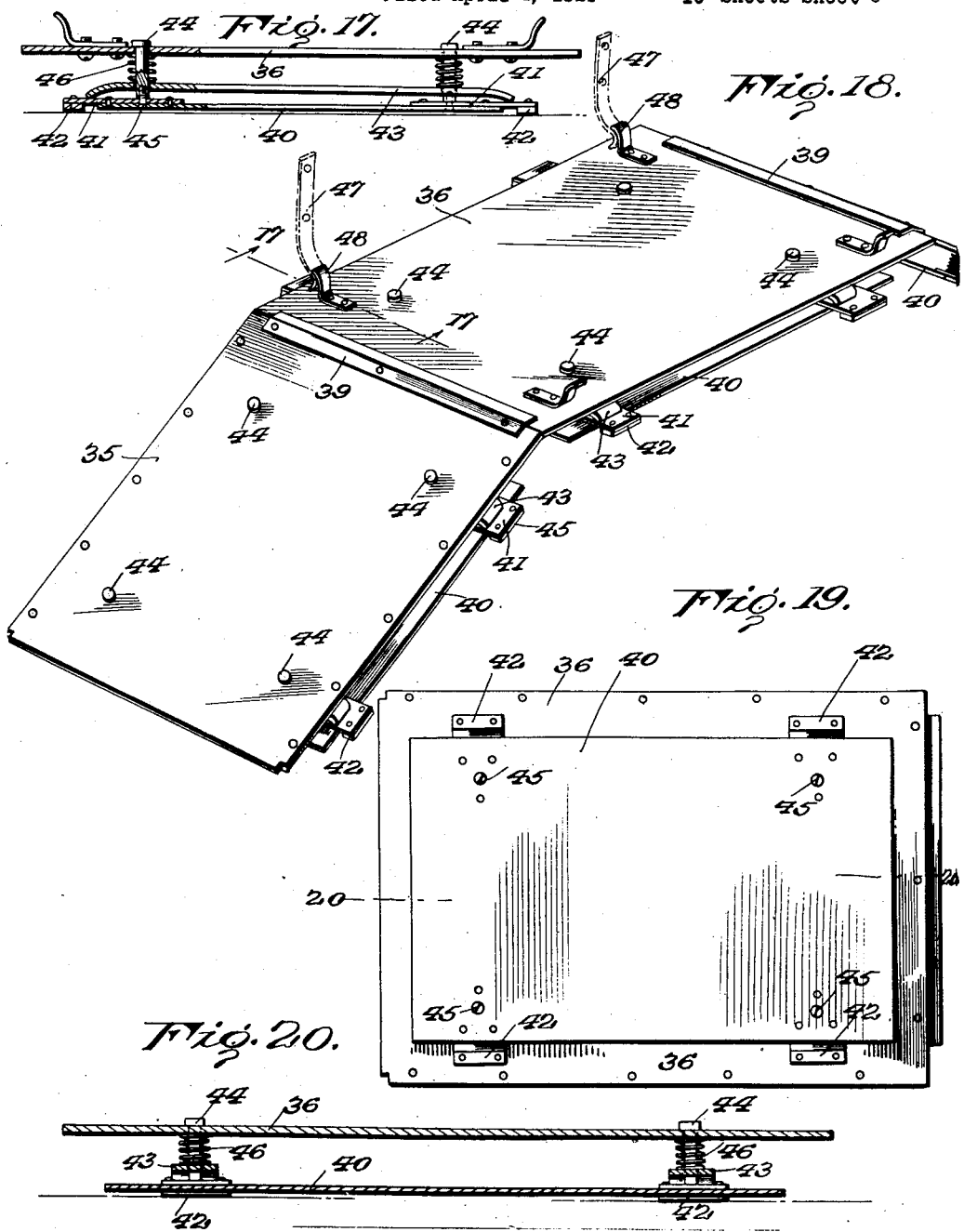

Oct. 27, 1925.
J. W. BAGLEY ET AL
1,559,400
AERO CAMERA
Filed April 4, 1921   10 Sheets-Sheet 9
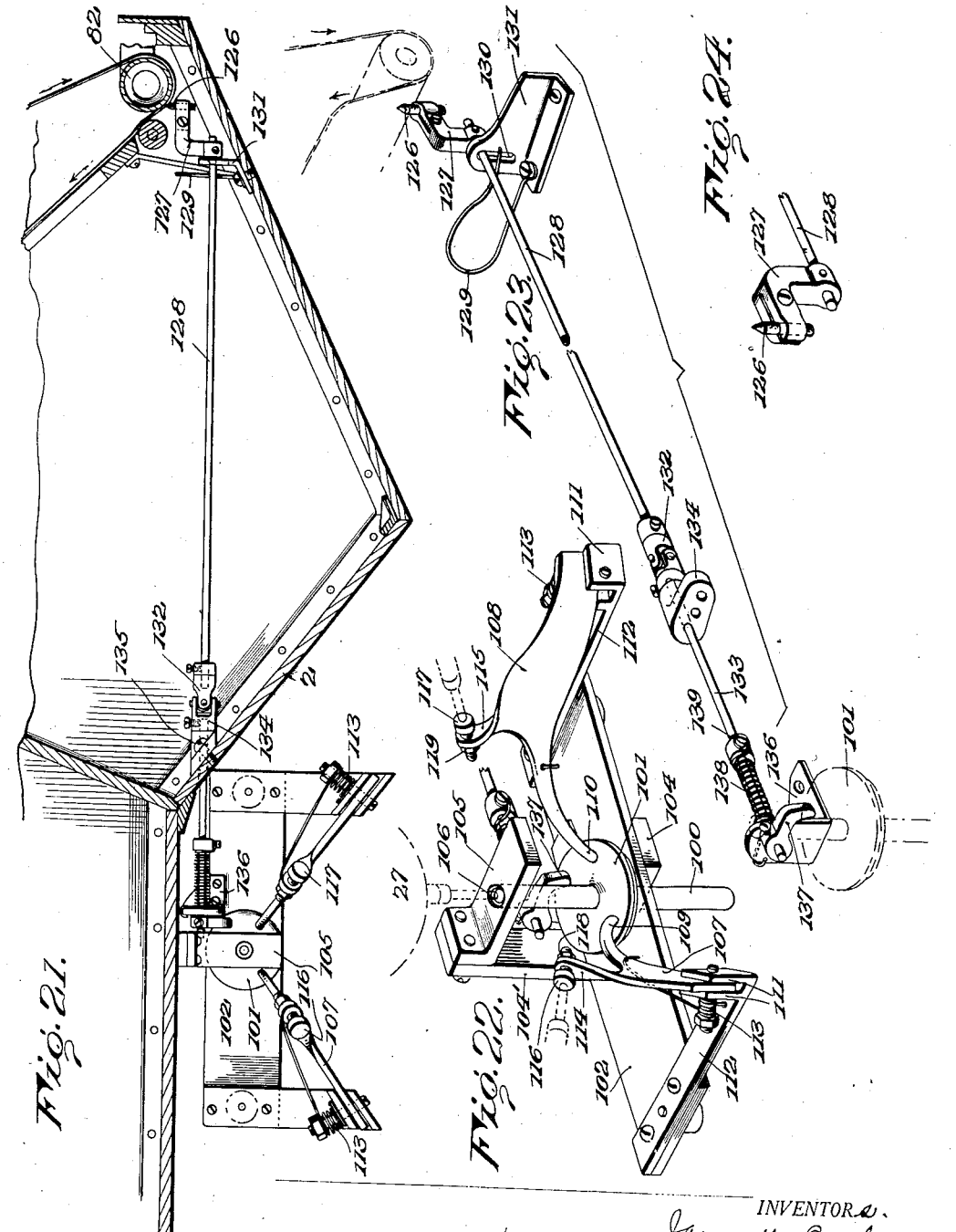
INVENTORS.
James W. Bagley
Carl H. Au
BY
Mauro, Cameron, Lewis & Kerkam
ATTORNEYS.

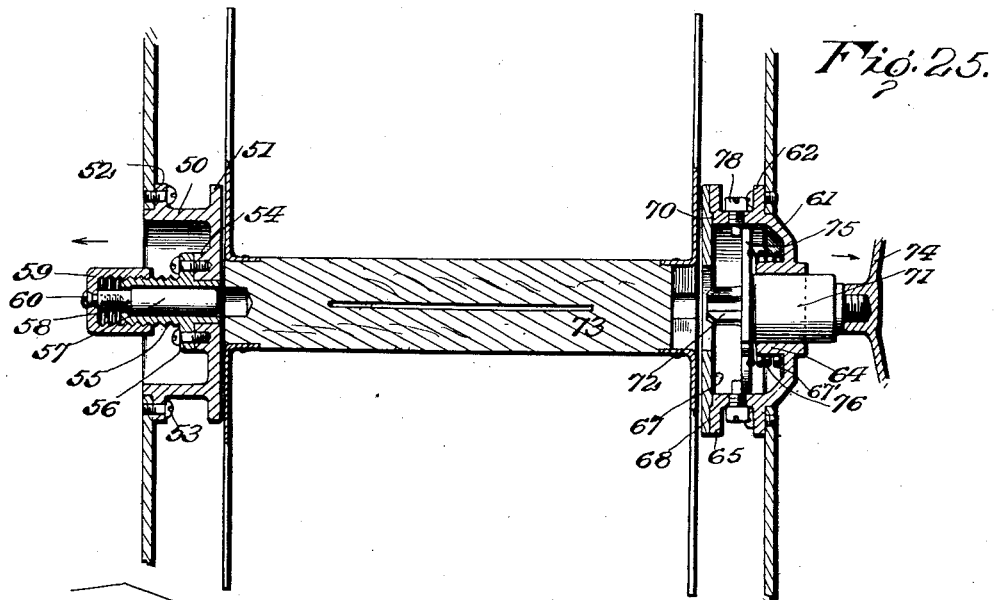
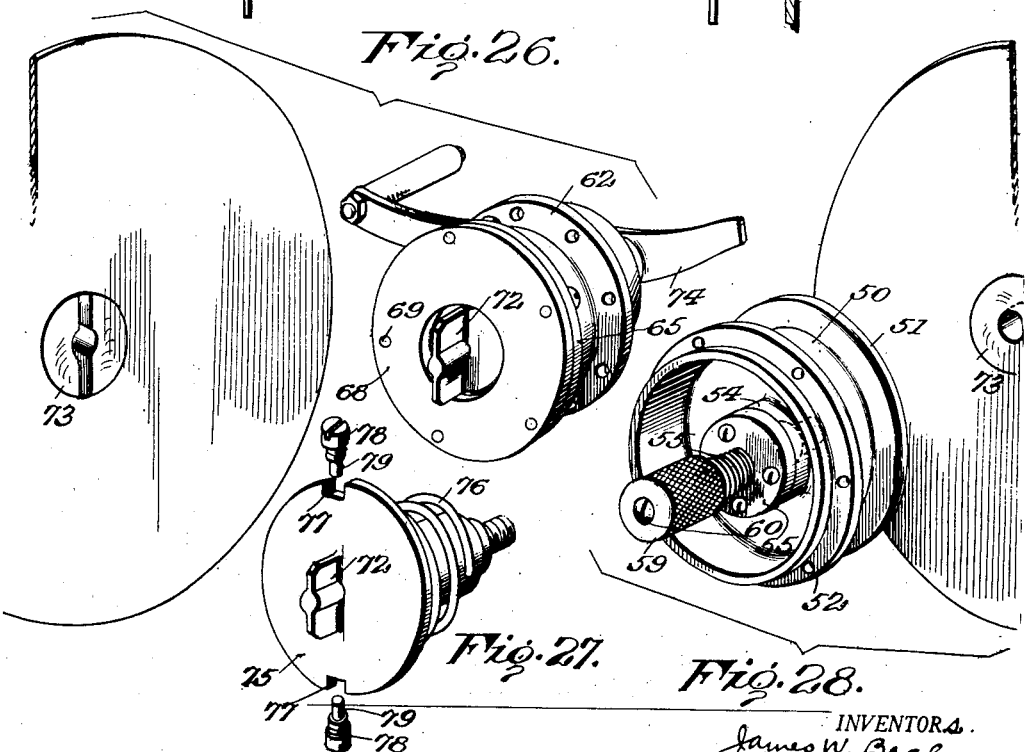

Patented Oct. 27, 1925.

1,559,400

UNITED STATES PATENT OFFICE.

JAMES W. BAGLEY, OF FAYETTEVILLE, TENNESSEE, AND CARL H. AU, OF WASHINGTON, DISTRICT OF COLUMBIA.

AERO CAMERA.

Application filed April 4, 1921. Serial No. 458,208.

*To all whom it may concern:*

Be it known that we, JAMES W. BAGLEY and CARL H. AU, citizens of the United States of America, and residents of Fayetteville, Tenn., and Washington, District of Columbia, respectively, have invented new and useful Improvements in Aero Cameras, which invention is fully set forth in the following specification.

The present invention relates to improvements in aerial cameras for taking pictures of the ground from fast moving aircraft and, more particularly, to multi-lens surveying cameras of said type, and has among its primary objects to photograph a maximum area compatible with accurate mapping and with fewer flights in shorter time and at less expense than with a single lens camera; to obtain photographs covering areas of such shape and dimensions that they may be arranged in lapping so as to give the most favorable relation for accurate mapping use and for economy in completely covering a desired area; to locate the positions of points in mapping more accurately and particularly over hilly or rolling areas as great as 300 or 400 square miles with fewer initial control points; to determine by aid of the oblique photographs the elevation of ground points such as hilltops, ridges, stream levels, etc., accurately enough for contouring topographic maps; to afford data for checking and revising existing maps and also furnishing the data for the construction of maps that are free from mistakes of the surveyor. The above and other objects will be more fully explained in the following detailed description.

With the above objects in view, our invention resides in general in providing a multiple-lens camera, one of three lenses being here shown, comprising a separable light-tight two-part casing, one part constituting a magazine for a roll film and the other part a three-lens camera box, the focal planes of the lenses being so arranged that the central focal plane is normally horizontal and the side focal planes are equally inclined thereto, preferably at an angle of 35°. The side fields thereby include picture areas overlapping the central field and afford means of joining the pictures. Each lens is provided with its own automatic shutter. The three shutters are simultaneously opened and closed by a flexible cable operating on the shutter-operating means through a synchronizing device. The camera is also provided with a film-marking device operated by the shutter-operating mechanism and with a registering device operated through a specially designed tracking means when the film is advanced for a new exposure.

Other features of the invention include a light-tight, all-metal, non-sticking joint between the magazine and lens box; photo-registering notches in the focal plane whereby the film is marked in predetermined points for reference; improvements in film spool bearings and winding device; improvements in film pressure devices, and marking devices, and providing a symmetrically disposed structure for constant balance.

In the drawings—

Figs. 1 and 2 are views showing the camera casing in rear and side elevation. The dotted line positions indicate universal suspension of the camera.

Fig. 3 is an enlarged transverse central sectional view on the line 3—3 of Fig. 2.

Fig. 4 is a sectional detail view showing the light-tight joint at the junction of the upper and lower sections of the casing.

Figs. 5 and 6 are perspective views of the upper and lower portions of the camera casing separated to show interior construction.

Fig. 6ª is an enlarged detail view of one of the photo-registering notches shown in Fig. 6.

Fig. 7 is a view, partly in section, showing one of the clamping devices.

Fig. 8 is a vertical sectional detail view of the central lens box showing the film pressure means.

Figs. 9 and 10 are sectional and perspective detail views respectively showing tension and compression members for maintaining rigidity of lens box.

Fig. 11 is an enlarged central sectional view on the line 11—11 of Fig. 4, showing the roll film winding and registering, film tracking and spool bearing mechanisms.

Fig. 12 is a bottom view of the multi-lens box showing the shutter synchronizing means and its connection with a flexible shutter-operating device.

Fig. 13 is a sectional detail showing the hand-operated push member.

Fig. 14 is a central longitudinal sectional view through the shaft of the synchronizing element, showing in dotted lines the shutter-operating levers.

Fig. 15 is a sectional detail showing the yielding connection between the casing and one of the shutter-operating levers.

Fig. 16 is a diagrammatic view showing the angular relation of the focal planes and the displacement of ground elevations on the side focal planes.

Fig. 17 is a detail view, partly in end elevation and partly in broken section on line 17—17 of Fig. 18, showing one of the spring-pressed film backing plates and its cover support which also serves as a door to the magazine box.

Fig. 18 is a perspective view showing the sectional closure for the film chamber.

Fig. 19 is a bottom face view of one of the side backing plates and its cover plate.

Fig. 20 is a sectional view on the line 20—20 of Fig. 19.

Fig. 21 is an enlarged sectional detail view showing the film-marking device and its connection with the synchronizing mechanism.

Fig. 22 is a perspective detail view showing parts of the synchronizing device and cam for operating the marking device.

Fig. 23 is a perspective detail view of the film-marking device.

Fig. 24 is a detail view of the pencil holder.

Fig. 25 is a longitudinal sectional view through the film-holding spool and its supporting and rotating means.

Figs. 26, 27 and 28 are perspective detail views of the spool holding and rotating means.

Referring to the drawings, the camera comprises a two part separable casing, the upper part 1 of which is for holding the photographic film and the lower part 2 of which is preferably divided into three lens boxes 3, 4 and 5, each provided with its own lens and shutter mechanism. The walls of the casing are made of light metal such as aluminum and may be built up of plates riveted or otherwise secured together in a light-tight manner, or both parts of the casing may be cast. As shown by way of example, the walls of the casing consist of aluminum plates secured together at their edges by brass pieces 6. One side of this brass piece is secured to the wall plate by rivets 7 and the other flange is secured to the companion plate by screws 8. To secure greater rigidity in the structure, particularly in the lens box portion, tie rods 9 are passed through the front and rear walls of the casing and through intermediate tubular compression members 10 in which the rods are centered by bushings 11. The exterior portions of the rods are threaded to receive nuts 12 which, when screwed home, force the walls against the ends of the tubular compression members and thereby prevent their inward and outward movement.

The upper and lower parts of the camera casing are separable along the focal planes of the lens boxes. In order to obtain a light-tight point along this separation and to avoid the objectionable effects of sticking together by cohesion at this point between contacting surfaces of aluminum, we have provided a joint of special design which avoids this objection. Referring to Fig. 4, 1 and 2 are portions of the upper and lower casing walls of aluminum when they make joint with each other. Bearing strips 13, 14 of metal, such as aluminum or copper, are secured along the inner and outer faces respectively of walls 1, 2 somewhat back of the overlapping edges of the two walls. The joint thus formed is made light-tight by means of a plate 15 of metal harder than aluminum, such as brass or like metal, secured to strip 14 and extending over the contacting edges of the joint. The edges of walls 1 and 2 are preferably beveled at 16 to facilitate placing the magazine portions in position on the companion part 2. By reason of this construction the bearing surfaces at the joint are of unlike metals, to wit, aluminum and brass for example, and exhibit no tendency to stick together.

The upper and lower sections of the casing may be removably secured together in any convenient manner but we preferably provide clamping members 17 provided with holes to receive the ends of tie rods 9 and which are secured in position by the nuts 12. The free ends of bracket pieces 17 are provided with slotted openings the bottom portions of which are enlarged and slightly conical to receive the tapered portions 18 of clamping nuts 19 which are adapted to screw onto threaded members 20 mounted on the upper casing section and are so positioned as to enter the slots in the bracket pieces. The clamping nuts 19 are retained on their threaded members by lock nuts 21.

The lower section of the camera casing is provided with two partitions 22, 23 connecting the front and rear walls of the casing and dividing the lower section into three lens compartments or lens boxes 3, 4 and 5. The bottom walls 24, 25 of the side lens boxes are inclined to the bottom wall 26 of the middle box at an angle of 35°. Each of these bottom walls is provided with an opening for receiving a camera lens 27 with its shutter mechanism of any approved type. At the rear of each lens box and in the focal plane of its lens, there is a film-supporting frame 28, Figs. 6 and 8, secured to angle pieces 29 fast to the casing wall. 30 are blinds depending from the frames for intercepting stray light rays. The side frames are inclined to the central frame at an angle of 35° to correspond with the angular arrangement of the axis of the lenses 27. Idle rolls 31 have their ends supported in brackets 32, Fig. 6, secured to the front and back walls of the casing and are located at the edges of the frames in the path of the film. Their purpose is to prevent the dragging of the film over the edges of the frame and thereby lessen the tension on the film roll.

The inner edges of each frame 28 are provided with photo-registering notches 33, 34, the positions of which are determined by trial and which expose the margins of the negatives to pencils of light at each exposure, whereby lines can be drawn on the negative or prints which shall be coincident with one side each of two opposite notches. Notches 33 give data, in the form of sharply defined lines, for determining the intersection of the lens axis with the negative. Points 34 are so positioned as to indicate the cutting lines for joining the pictures.

The lower end of the film holding section of the casing 1 is closed by plates 35, 36, 37 arranged parallel to and opposite the open frames 28. Side plate closures 35 and 37 are secured by means of angle pieces 38 to the wall of the film holder. The central plate 36 is removable and constitutes a magazine door for the film holder. This plate when in its closed position abuts against angle pieces 38 on the casing wall and against strips 39 supported on the edges of plates 35 and 37. These strips close the joints between the central plate 36 and side plates 35 and 37.

On the closure plates 35, 36 and 37 are mounted identical film pressure plates 40 adapted to be seated on the frames 28. The detailed construction of these plates will be understood by reference to Figs. 17 to 20 when considered in connection with Figs. 6 and 8. One only of these film pressure plates will therefore be described. In order that the film pressure plate may afford a space between itself and the sides of the film-supporting frame 28 to receive the thickness of the film to be inserted, the plate 40 is provided with four members 41 which are bolted or otherwise secured to the plate and extend beyond the sides thereof. On the film side of the projecting portions of these members are secured blocks 42 adapted to seat on the frame 28 and which are of suitable thickness to raise the pressure plate 40 slightly more than the thickness of the film above the plane of the frame 28. To the back of plate 40 is applied a yielding pressure and, for this purpose, we preferably employ pressure transmitting members 43 which extend beyond the edges of the pressure plate 40 and have down-curved ends resting against members 41. Plates 36 are provided with holes for receiving headed pins 44, the lower ends of which are made fast to member 41 and to film pressing plate 40 by screws 45. Pins 44 work freely in holes in closure plate 36, for example, and are surrounded by coiled springs 46 which exert a yielding pressure upon member 43. This pressure is transmitted at the ends of members 43 to members 42, thereby retaining the sensitive film and keeping all portions of the latter in the focal plane when positioned for exposure and eliminating all friction when a film is wound for the next exposure.

The central closure or magazine door 36 is held in place by spring catches 47, two of which are shown in dotted line position in Fig. 18, secured to the walls of the casing, and are adapted to engage keepers 48 on the back of the door.

Guides 49 on the frame 28 correctly position and guide the film when the two parts of the casing are locked together.

The film holder casing 1 is provided with an upper and lower set of extended end bearings, one to receive the end of the spool carrying the unexposed film and the other to receive the ends of the spool carrying the exposed film. The construction of these bearings is more particularly shown in Figs. 11, 25 to 28. The bearings for the lower spool are like the left-hand bearing of the upper spool. The description of the latter will, therefore, apply to the former. 50 is a cylindrical member cast or otherwise made, preferably of aluminum, and is provided with inner and outer flanges 51, 52, the latter flange being provided with holes to receive screws 53 for securing the bearing over an opening in the side of casing wall 1. The inner end of cylindrical member 50 is provided with a hollow hub 54 to the outer end of which is secured, by screws or other means, an exteriorly threaded tubular nipple 55 provided with a flange 56. Within the nipple 55 slides a trunnion pin 57 having an outer reduced portion 58 which passes through a narrowed opening in the end of nipple 55 and is thereby prevented from outward displacement. 59 is a threaded cap adapted to engage threaded nipple 55 and to be secured to pin 57 by means of a screw 60 which fits loosely in the hole in the cap.

The trunnion pin 57 is moved in and out of bearing position by screwing and unscrewing the cap 59. When the pin engages the end of the film spool, the outer end of the cap 59 is substantially flush with the surface of the casing wall and is protected within the space of cylindrical member 50. By reason of this manner of supporting and moving the bearing pin, the latter does not work loose from its roll-supporting position.

Means are provided for rotating one of the film spools, preferably the upper spool, from the exterior of the casing. This means comprises a trunnion casing 61, Figs. 11 and 25, adapted to enter an opening in the wall of the film casing 1 and to be secured thereto by means of a flange 62 and screws 63. The outer end of the casing 61 is provided with an end closure having a hollow central bearing 64, and the inner end of casing 61 is provided with an outer flange 65 which is counterbored to form a recess 66. To flange 65 is secured an annular plate 68 by screws 69, Fig. 26. This plate is preferably provided with a projecting central disk portion 70 adapted to seat in the counterbored recess 66 and to back fiber washer 67, thereby more securely keeping the plate in concentric alinement. 71 is a film spool bearing or trunnion, the inner end of which is provided with a flat key portion 72, Fig. 26, adapted to enter a correspondingly shaped socket in the end of the shaft of the spool 73. A crank-handle 74 for turning the trunnion 71, and thereby turning the spool shaft 73, is secured to the end of trunnion 71 in any suitable manner such as by means of a threaded stud and socket connection as shown. In order to normally force the key end of trunnion 71 into its socket in the spool shaft, trunnion 71 is provided with a disk 75 which forms one abutment for a spring 76, Fig. 27. The opposite end of spring 76 takes over the cylindrical bearing 64 and has its corresponding abutment against a fiber washer 67' bearing on casing 61. The spring 76 normally forces the disk 75 against the washer 67 and thereby holds the trunnion 71 into position for supporting the end of spool 73. In the periphery of the disk 75, notches 77 are provided, preferably two in number, oppositely disposed as shown. In the wall of casing 61 and diametrically opposite each other, two screws 78 are inserted, each terminating in a pin 79 and are adapted to clear said notches 77.

In order to release the spool 73 from its trunnion supports, the cap 59 is unscrewed, thereby withdrawing pin 57 from one end of spool shaft 73. The handle 74 is also pulled outward and given a turn to register notches 77, 77 in line with pins 79. Continued outward movement of the handle 74 releases key 72 from its socket in the end of the spool shaft and releases the spool. In order to lock the trunnion 71 in its outward position, the handle 74 is given a further slight turn to throw notches 77 out of alinement with pins 79 and then the handle is released. The pins 79 now hold the trunnion in its released position against the pressure of spring 76, as shown in Fig. 25.

80, 80 are idle film rolls mounted in brackets 81 secured at opposite points on the walls of casing 1. 82, 82 are other idle rolls mounted on upper casing 1 for guiding the sensitive film into and out of the focal planes. 83 is an adjustable guide roll, preferably hollow for the sake of lightness and having side flanges 84 for guiding the film. Roll 83 is mounted in adjustable brackets 85 on the sides of the casing 1.

*Tracking and indicating devices.*—In order to reel off successively equal lengths of film surface and, if desired, to indicate on the exterior of the casing the number of sections reeled off, special means have been devised which are dependable in action and give accurate indications. These means comprise a tracking device which is actuated by the moving film and indicating means operated by the tracking device. The latter device comprises an arm 86 which may be of any suitable design but preferably consists of two flat strips of metal secured together as shown, one of the strips having its opposite ends bent outward to form, with its companion strip, forked bearings. In one of these forks is mounted a revoluble tracking wheel 87, preferably serrated, and in the other fork a shaft or pin 88 which is supported in bearings 89 preferably struck up from a metal plate 90. This plate is preferably secured to the casing wall 1 near one end of the exposed film roll 73. Tracking wheel 87 is yieldingly pressed against the roll film by means of a spring, such as spring 91, one end of which is fast to plate 90 and the other end is secured to arm 86 near its pivotal support. As shown, a pin 92 passing through the prongs of the pivotally supported fork serves as a place of attachment for the spring 91. It will thus be apparent that tracking wheel 87 is adapted to rotate on its own axis by reason of its engagement with the moving film while also having a yielding movement about the axis 88 of arm 86 as the result of the increasing thickness of the film which is being rolled up on spool 73. The rotations of tracking wheel 87 are transmitted through universal joints 92', 93 and a telescoping connection 94 to a train of gears 95, 96 suitably mounted on the casing wall to a stub shaft 97 extending through the wall of the casing and carrying an indicating hand 98 adapted to move past a register mark or element 99.

The tracking wheel 87 and gears 95 and 96 are preferably so designed that one complete revolution of hand 98 corresponds to the length of film required to be transferred from the supply spool onto the winding spool for each new exposure.

*Shutter synchronizing mechanism.*—As illustrated, three camera lenses are shown, and it is essential that their respective shutters be simultaneously operated at each exposure. With this object in view, the synchronizing mechanism is adapted to operate any known form of plunger-operated shutter timing device, and comprises a thrust member consisting of a longitudinally movable rod 100, Fig. 22, having a disk 101 fast thereto and is provided with means for supporting it in vicinity of the plungers operating the shutters. Preferably, for this purpose a plate 102 is supported on a depending extension 103, see Fig. 3, of the lower wall 2 of the lens box. One arm of an angle piece 104 is made fast to plate 102, and to the companion arm 104' is secured a bearing piece 105 provided with an opening 106. In openings in arms 104 and 105, the rod 100 is supported and is free to move longitudinally. Arranged to move in radial planes passing through rod 100 are two spring-pressed arms 107, 108, symmetrically disposed in respect to a central plane passing through rod 100 and the center one of the camera lenses. These arms are provided with fingers 109, 110, and are pivotally supported in bearings 111 carried by members 112 fastened to plate 102. Springs 113 normally press fingers 109, 110 against disk 101 and out of operating position. Arms 107, 108 are provided with thumb pieces 114, 115 in which are mounted adjustable hammer pieces 116, 117 adapted to be fixed in adjusted position by lock nuts 118, 119.

Mounted on the depending side plate 103 and in operative relation to the outer end of rod 100, is the head 120 of a flexible shutter-operating cable 121 preferably of the kind described in U. S. Patent to Au, No. 1,331,311, Feb. 17, 1920 whereby the rod 100 may be advanced against pressure of springs 113 by pressing on member 122 of the cable 121, Fig. 12.

In the paths of hammers 116, 117 and the end of rod 100 are positioned the shutter-operating plungers 123, 124 and 125 for operating the lens shutters.

To operate the shutters, the member 122 of the flexible cable is pushed in and causes rod 100 and its disk 101 to advance. Fingers 109 and 110 resting on disk 101 are simultaneously lifted, and hammers 116 and 117, together with the end of rod 100, are forced against the ends of shutter plungers 123, 124 and 125, thereby operating the shutters simultaneously. The parts of the synchronizing device are restored under the influence of springs 113.

*Marking device.*—At the moment the exposure is made, the synchronizing mechanism operates means for inscribing a line on the film designating the boundary line between the exposed section and the following section. The means preferred for this purpose is shown in Figs. 21 to 24 and comprises a pencil 126 which is adapted to be moved into yielding contact with the film while it is given a rotation, thereby marking a short straight line. Pencil 126 is clamped in one arm of an elbow member 127, the companion arm being secured on the end of a shaft 128 which is yieldingly supported by a spring 129 and guided in a slot 130 formed in a bracket 131 fast to the wall of the lower casing. The opposite end of shaft 128 is connected through a universal coupling 132 with a drive rod 133 extending through wall 2 and having a support in a bearing 134 secured to the inside of the wall by screws 135. A bracket 136, fast to plate 102, supports the outer end of rod 133. On the end of rod 133 is fast a cam member 137 normally held in yielding engagement with disk 101 by means of a torsional spring 138, one end of which is secured to rod 133 by screw 139 and the opposite end of which is fast to bracket 136.

In operation, cam 137 is rotated when the synchronizing disk 101 is raised to release the camera shutters, thereby rotating rod 133 and, through connection 132, shaft 128. Pencil 126 moves into marking position against the film and is yieldingly held in this position by spring 129 during the entire period of rotation of shaft 128, thereby prolonging the contact of the pencil with the film and tracing a straight line for reference. When disk 101 is restored to its initial position by the pressure of springs 113, the pencil 126 moves out of its marking position under the action of spring 138 against the tension of which the shaft 128 was initially rotated.

The operation of the camera as thus far described will be readily understood from the above description and, briefly stated, is as follows:—

Assuming that the parts of the camera have been assembled and that the magazine section 1 has been separated from the lens box section 2 and the central magazine closure 36 has been removed, an empty spool 73, which is provided with a dummy piece of paper, is introduced through the magazine opening and into alinement with trunnion pin 57 and bearing 71, both of which have been pulled out into their outermost positions. Screw-cap 59 is rotated to advance pin 57 into the end socket or recess provided in the spool, and trunnion disk 75 is released from pins 79, Fig. 26, by a part turn of crank 74. Spring 76 pressing on disk 75 forces the key 72 on trunnion 71 into a slot previously formed in the end of the spool. Further advance of the key is prevented by disk 75 abutting against washer 67 and plate 68 fast to the trunnion casting 61. Plate 68 and flange 51 on casing 50 form extended surfaces for steadying the roll 72.

The lower spool 73' with its unexposed film is then inserted and held in position by manipulating screw-caps 59 as above described. The free end of the film covering is then passed over the first guide rolls 80, 82 and in front of film pressing plates 40, and is joined to the free end of the dummy paper wound on spool 73 and which has been passed over second rolls 83, 80 and 82. The central closure 36 is then inserted and held in place by its clips 47 and 48 against flanges 38 and joint strips 39.

The magazine is lifted by handle 140 and positioned on the lower casing 2, the aluminum edges of the upper casing wall 1 resting on plates 13 and the aluminum edges of lower casing 2 resting against plates 14 (Fig. 4). The joint is closed to light both by outer brass plate 15 and the zig-zag structure of the joint. Studs 18 then rest on the slotted openings of clamping plates 17. Nuts 19 are then screwed home, the conical ends of the nuts entering the conical recesses of the slots, thereby making a very secure fastening. The sensitive film now rests on the frames 28 with its sensitive surface in the focal planes of the lenses and exposed through the openings in the frames. The backing of the film rests against the spring-pressed plates 40 which serve to guide and keep the film in its proper position in the focal planes. Sidewise displacement of the film is prevented by means of guides 49 on frames 28.

The camera box may be supported on the fuselage of the aeroplane in any suitable manner whereby the central focal plane is kept as near as possible in a horizontal plane, such as by means of gimbals or by means of a gyroscope.

In taking a series of photographs while in flight, the operator presses the member 122 of the flexible cable 121 at predetermined intervals along the course followed by the aeroplane. Spindle 100 and disk 101 of the synchronizing device are advanced, and fingers 109 and 110 of rocking arms 107 and 108 are simultaneously lifted. The shutter triggers or plungers are simultaneously operated to open and close the automatic shutters of the lenses. While the shutter mechanism is thus being operated, the pencil 126 makes a mark on the film by reason of its connections with cam 137 resting on disk 101 as above explained.

Referring to diagrammatic Fig. 16, it will be seen that each time the synchronizing device is operated, three negatives A, B, C are taken, distinguishable from each other by suitable stencils such as 3^A, 3^B, 3^C shown in Fig. 6, and covering an angular scope of 120° across the direction of flight. The oblique negatives overlap areas appearing in the horizontal negative. This enables the photographs to be arranged so as to give the most favorable relation for accurate mapping and enables a given area to be completley covered economically. The oblique photographs can also be used to determine elevation of ground points by determining the amount the image of the ground point, such as a ridge or hill, is displaced with respect to a horizontal plane and then computing the elevation from that displacement.

At the time of making the exposure, rays of light pass through notches 33 and 34 giving opposite images, the corresponding sides of which are coincident with the line joining them and afford accurate reference marks for locating lines on the photographs.

After making one exposure, the film is advanced by turning handle 74 until indexhand 98 makes one complete revolution. A proper length of film is thereby measured and wound off the supply spool for the next exposure. As the exposed film is wound onto spool spindle 73, the sharp points of the spring-pressed tracking wheel 87 positively engage the film and cause the wheel to rotate. A definite length of film will thereby give a definite number of revolutions to wheel 87 which will be transmitted through shaft 94 and its reducing gear connections to pointer 98. The reduction is preferably such that one revolution of pointer 98 corresponds to a proper length of film for the three focal planes.

What is claimed is:—

1. In an aero-camera, the combination of a casing having a magazine compartment for receiving a roll film sensitive surface, a lens compartment separable from said magazine compartment and provided with a plurality of lenses having their axes in a common plane and their focal planes inclined to each other, and film supporting frames between said compartments adapted to support the photo-sensitive surface in the said focal planes, said frames being provided with photo-registering notches adapted to locate a predetermined point on the negative.

2. In an aero-camera, the combination of a casing having a magazine compartment for receiving a sensitive surface, a lens compartment provided with a plurality of automatic shutter-controlled lenses having their axes in a common plane and their focal planes equally inclined to each other, a manually-operated plunger having a synchronizing disk, yieldingly restrained members having fingers pressing on said disk and having elements adapted to release said shutters when said plunger is operated.

3. In an aero-camera, the combination of a casing having a magazine compartment for receiving a sensitive surface, a lens compartment provided with a plurality of automatic shutter-controlled lenses having their axes in a common plane and their focal planes inclined to each other, a manually-operated plunger one end of which is movable into position to operate one of said shutters, said plunger being provided with a disk fast thereto, yieldingly restrained members having fingers pressing on said disk and having adjustable elements adapted to move into position to simultaneously operate said other shutters when said plunger is operated.

4. In an aero-camera, the combination of a casing having a magazine compartment adapted to receive a roll film and a lens compartment provided with a plurality of automatic shutter-controlled lenses having their axes in a common plane, and their focal planes equally inclined to each other and in the path of said film, mechanism for synchronizing the operation of said automatic shutters, a marking element movable into contact with said film, and means for operating the same comprising a rod one end of which yieldingly supports said marking element, guide means for said rod, and cam means operated by said synchronizing means and having universal joint connections with said rod.

5. In an aero-camera, the combination of a casing having an upper magazine compartment adapted to receive a roll film and a lower lens compartment provided with a plurality of automatic shutter-controlled lenses having their axes in a common plane, open frames for supporting said film in the focal planes of said lenses, said planes being equally inclined to each other, and spring-pressed plates carried by said upper section for keeping said film in said focal planes.

6. In an aero-camera as defined in claim 4 wherein said plates each comprises a supporting plate, a spring-pressed second plate carried by said first-named plate and provided with offset members fast thereto adapted to rest on said frames leaving a clearance space between said second plate and the surface of said frame for receiving the film, and pressure-distributing members between said springs and said offset members.

7. In an aero-camera, the combination of a casing having an upper film roll magazine compartment and a lower lens compartment provided with three automatic shutter-controlled lenses having their axes in a common plane and radiating from a common center, open frames mounted in the lower compartment for supporting the film in the focal planes of said lenses, spring-pressed film pressing plates mounted in said upper compartment for holding the film in said focal planes, and synchronizing mechanism for simultaneously tripping said shutter mechanism.

In testimony whereof we have signed this specification.

JAMES W. BAGLEY.
CARL H. AU.